United States Patent
Oswaks et al.

[11] Patent Number: 5,813,433
[45] Date of Patent: Sep. 29, 1998

[54] FAUCET WITH CODE ELEMENT

[75] Inventors: Jonathan Oswaks, Westlake Village; Jean-Pierre Durand, Los Angeles; Peter Y. Carris, Pasadena, all of Calif.

[73] Assignee: Emhart Inc.,, Newark, Del.

[21] Appl. No.: 694,920

[22] Filed: Aug. 9, 1996

[51] Int. Cl.⁶ .................................................. F16K 37/00
[52] U.S. Cl. ...................................... 137/553; 137/625.4
[58] Field of Search ................................ 137/553, 625.4, 137/607, 625.41

[56] References Cited

U.S. PATENT DOCUMENTS

| | | | |
|---|---|---|---|
| Re. 26,838 | 3/1970 | Pecis | 137/556 |
| 1,615,730 | 1/1927 | Vallier | 137/553 |
| 1,912,295 | 5/1933 | Mintz | 137/607 |
| 2,847,031 | 8/1958 | Brown, Jr. | 137/625.41 X |
| 3,115,896 | 12/1963 | Roberts et al. | 137/625.41 |
| 3,313,057 | 4/1967 | Leddy | 16/121 X |
| 3,393,706 | 7/1968 | Burhop | 137/607 X |
| 3,885,584 | 5/1975 | Hock | 137/115 |
| 4,164,239 | 8/1979 | DeCesare | 137/553 |
| 4,796,329 | 1/1989 | Bory | 16/121 |
| 4,966,191 | 10/1990 | Azizi | 137/625.17 |

*Primary Examiner*—John Rivell
*Attorney, Agent, or Firm*—J. Bruce Hoofnagle

[57] ABSTRACT

A faucet 10 includes a brass support 42 mounted in a precise location in a housing 12 of the faucet. A slot 60 is formed in the brass support and receives a tab 64 of a color code ring 36 as the ring is positioned on top of a tower 18 of the housing 12 to properly locate the ring relative to the housing and to preclude rotation relative thereto. A shroud cover 19 is secured to the brass support 42 above the ring 60 to capture the ring between the cover and the top of the tower 18 and thereby preclude axial movement of the ring. Exterior surfaces 38 and 40 of the fixed ring 36 are formed with contrasting colors, such as "red" and "blue," which are clearly visible on opposite sides of the faucet 10. A handle 20 of the faucet 10 is located above the shroud cover 19 and is mounted for movement relative to the housing 12, the color code ring 36 and the shroud cover. The location of the contrasting colors on opposite sides of the ring 36, and the faucet 10, provide an indication to a user of the faucet as to which direction the handle 20 is to be turned to select hot or cold water through the faucet.

13 Claims, 3 Drawing Sheets

FAUCET WITH CODE ELEMENT

BACKGROUND OF THE INVENTION

This invention relates to a faucet having a code element, and particularly relates to a faucet having a code element for indicating to a user the direction in which to turn a handle, or handles, of the faucet to select the dispensing of hot or cold water, or a mixture thereof, from a spout of the faucet.

Faucet manufacturers have adopted a color code scheme for use with a faucet in guiding a user of the faucet in the selection of hot or cold water to be delivered from a spout of the faucet. In particular, the color "red" has been universally adopted to designate hot water, and the color "blue" has been universally adopted to designate cold water. Some type of red-blue indicator is typically attached adhesively or mechanically to a faucet handle of, for example, a single control faucet. As the user faces the faucet, the red portion of the indicator is to the left of the user to indicate that the user is to turn the handle to the left to select the hot water. The blue portion of the indicator is to the right of the user to indicate that the user is to turn the handle to the right to select cold water.

Typically, the red-blue indicator is located on the faucet in such a manner that the indicator moves with the handle. For example, the single control faucet of one manufacturer uses a knob-like handle which can be rotated and moved linearly from a front position to a rear position. This dual motion selectively locates valve structure of the faucet in such a position that the user is able to select the desired mixture of hot and cold water to provide the desired temperature of the water exiting from the spout of the faucet. A ring, having a red color on one-half and a blue color on the other half thereof, is centrally located on the top of the knob-like handle and is held in place by a press-fit button on the top thereof. As the user turns the knob-like handle, the red-blue indicator also turns with the handle so that, eventually, the red and blue colors are not at the original hot and cold water indicating positions. Other single control faucets use a lever-type handle wherein the indicator is attached to the top of the handle.

In U.S. Pat. No. 4,966,191, which issued on Oct. 30, 1990, the handle is formed by a lever which protrudes through a recessed window formed in a body or housing of the faucet. The recessed window is open to the front of the housing, and from the middle of opposite sides thereof. The window is encompassed, or enclosed, from the middle of the opposite sides and around the rear thereof. A red half-ring and a blue half-ring are assembled within the housing and about an inboard portion of the lever and include portions which are visible through the recessed window. As the lever is turned, the half-rings will also turn. In effect, if the hot water was turned fully on, the indicator would reveal only the blue half-ring which is indicative of cold water.

Thus, there is a need for a clearer and continuing indication of the direction in which a handle of a single control faucet is to be turned to select hot or cold water. Further, there is a need for a clear indication of the approximate positioning of a handle, on a repeat basis, to obtain a temperature mixture of the hot and cold water which is generally the same temperature mixture as a previous selection.

SUMMARY OF THE INVENTION

It is, therefore, an object of this invention to provide a faucet with a color code element which indicates at all times the direction for turning a faucet handle in the selection of hot and cold water.

Another object of this invention is to provide a faucet with a color code element which will allow the user of the faucet to repeatably locate the handle of the faucet at a location for the selection of a water temperature consistent generally with the water temperature of a previous selection.

With these and other objects in mind, this invention contemplates a faucet which includes a housing formed with a spout, a valve contained within the housing for selectively directing water to the spout and a handle mounted movably on the housing and attached to the valve for selecting hot water, cold water or a mixture thereof. An element having a first color on a first portion thereof and a second color contrasting the first color on a second portion thereof is mounted on the housing in a position to continuously provide an indication to a user regarding the direction to turn the handle to select hot water or cold water.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 5 is a partial sectional view taken along line 5—5 of FIG. 4 showing the manner of assembling the color code element with the faucet in accordance with certain principles of the invention.

DETAILED DESCRIPTION OF THE PREFERRED EMBODIMENT

Figure 1:
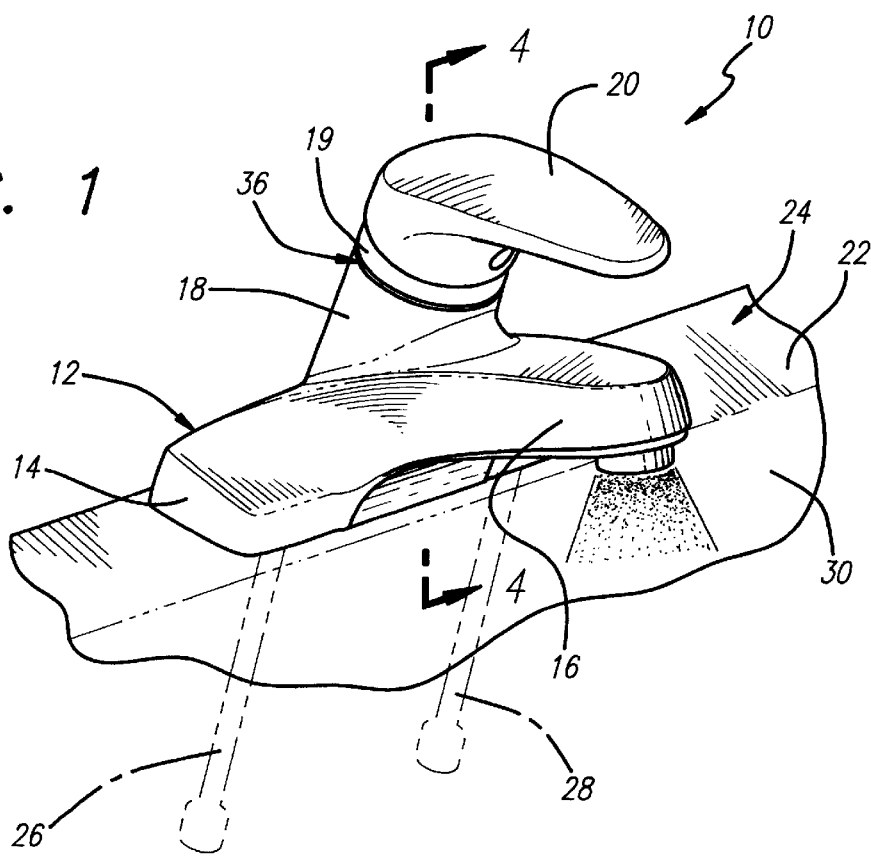
FIG. 1 is a perspective view showing a faucet with a color code element in accordance with certain principles of the invention

Referring to FIG. 1, a single control faucet 10 includes a housing 12 formed with a base 14, a spout 16 and a cylindrical tower 18 which is tilted forward. The faucet 10 further includes a shroud cover 19 and a lever handle 20 which are located above the top of the tower 18. The faucet 10 is mounted on a shelf 22 of a sink 24 and facilitates the selective supply of hot water, supplied through a hot water conduit 26, and cold water, supplied through a cold water conduit 28, to an outlet of the spout 16 and into a bowl 30 of the sink.

Figure 2:
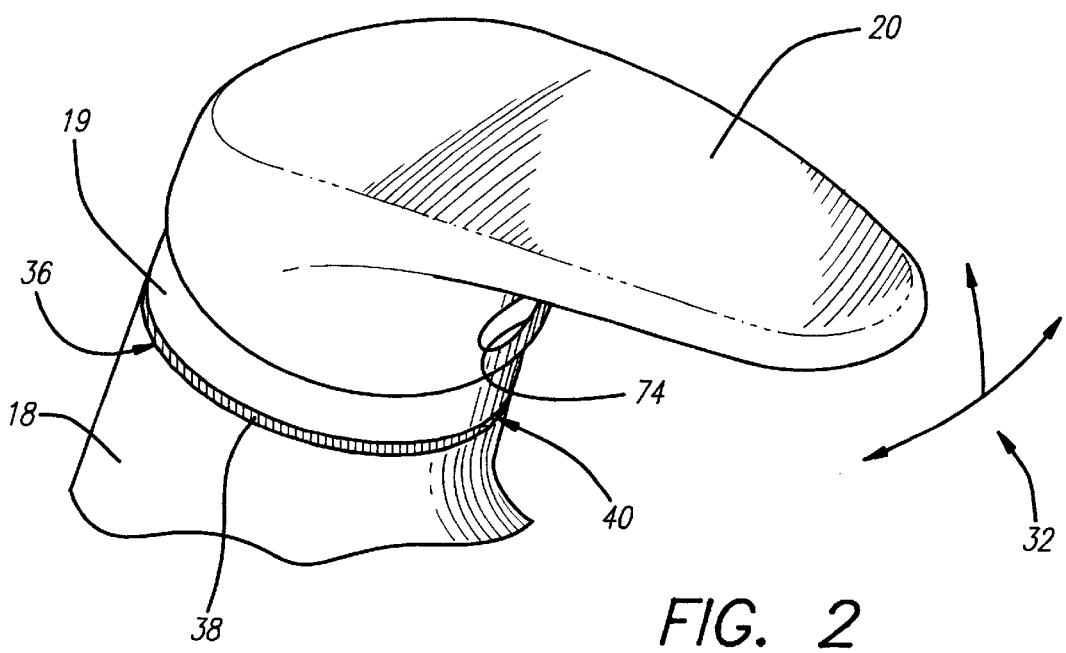
FIG. 2 is a perspective view of an enlarged portion of the faucet of FIG. 1 showing clearly the color code element in assembly with the faucet in accordance with certain principles of the invention.

As represented by the arrowhead lines 32 in FIG. 2, the lever handle 20 can be moved to the left, to the right and upward in the process of selecting the hot water, cold water and a mixture of each. In operation, movement of the lever handle 20 to the left selects the hot water through the conduit 26, to the right selects cold water through the conduit 28 while moving the lever handle upward increases the volume of water being selected from the hot and cold water conduits. Of course, the lever handle 20 can be positioned in any of a variety of locations within the two upper quadrants defined by the arrowhead lines 32.

Figure 3:
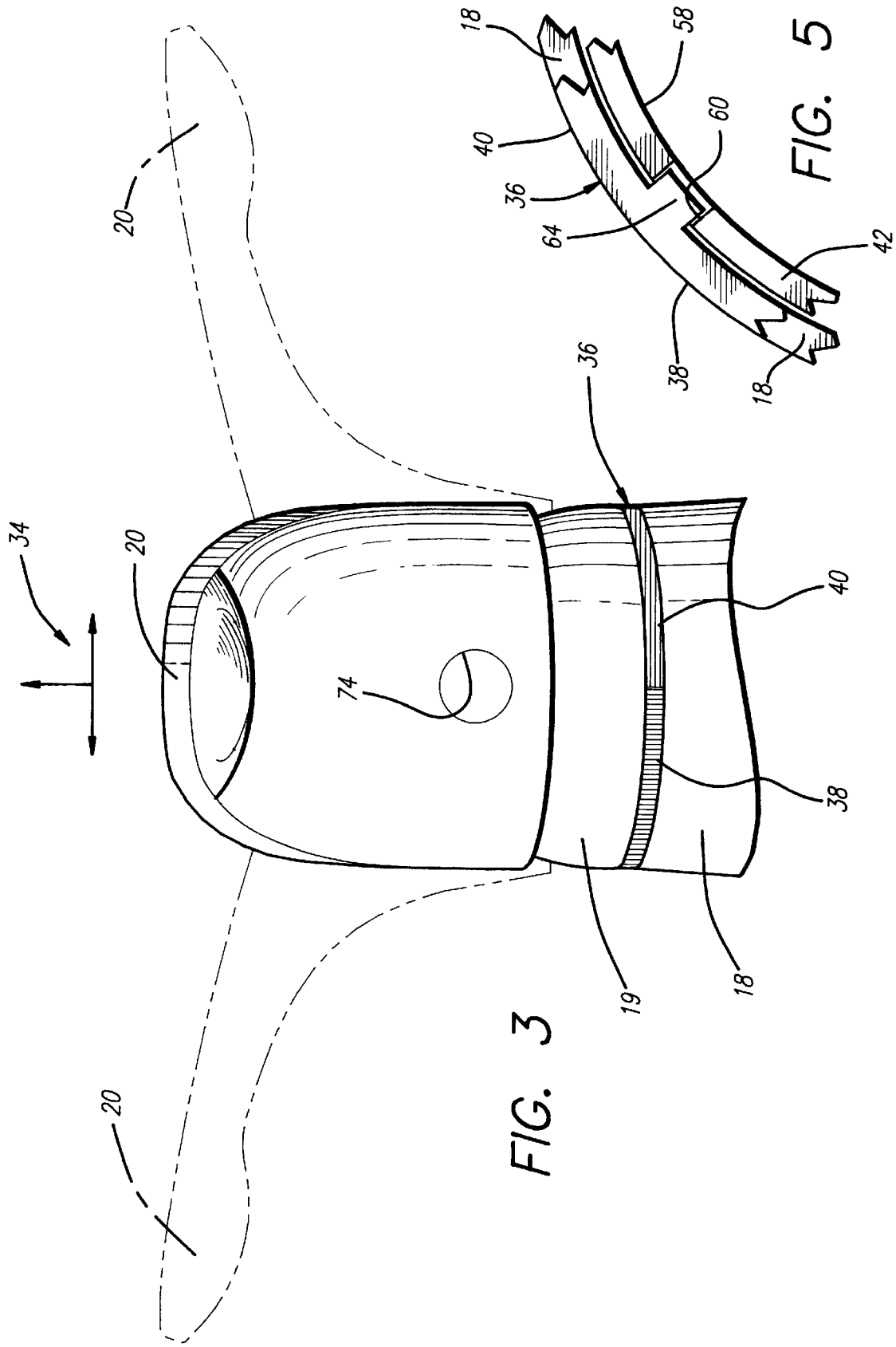
FIG. 3 is a front elevational view of an enlarged portion of the faucet showing the direction of moving a handle of the faucet in conjunction with the selection hot and cold water based on the color code indication of the color code element in accordance with certain principles of the invention.

Referring to FIG. 3, the lever handle 20 is shown in solid in its neutral position (i.e., no water flow) and is shown in phantom to the left and to the right with another set of arrowhead lines 34 representing the upward, left and right options for moving the lever handle.

As shown in FIGS. 1, 2 and 3, a color code element in the form of a ring 36 is located in a fixed and highly visible position between the top of the tower 18 and the underside of the shroud cover 19. The exposed exterior surface of the ring 36 is generally flush with the adjacent portions of the exterior surfaces of the tower 18 and the shroud cover 19 and is fully visible at all times. An exposed exterior surface 38 of a left half of the ring 36, as shown partially in FIG. 3, is finished in the color "red" while an exposed exterior surface 40 of a right half of the ring, also as shown partially in FIG. 3, is finished in the color "blue." Historically, the color "red" represents hot water and the color "blue" represents cold water.

When the faucet 10 is to be used, the user observes the "red" and "blue" colors on the left and right exterior surfaces 38 and 40, respectively, of the ring 36 and moves the lever handle 20 in one direction or the other to select the temperature of water to be dispensed from the spout 16. As noted above, the user can raise the lever handle 20, or move a knob handle rearward which may be used instead of the lever handle, to obtain a greater volume of water if desired. However, more importantly, by virtue of the fixed mounting of the ring 36, the contrasting "red" and "blue" colors will always be visible to the user in the fixed position regardless of the position of the lever handle 20. This provides an assurance to the user of the temperature characteristic of the water in the event that the user continues to turn the lever handle 20 in a particular direction after having initially selected that direction.

Also, when a user selects a water mixture at a pleasant temperature, the user may want to select that same pleasant temperature in the future. By noting the location of the lever handle 20 with respect to the adjacent color and location on the fixed ring 36 when the pleasant temperature was first selected, the next time the faucet 10 is used the user can turn the lever handle to the approximate noted location for the supply of water generally at the pleasant temperature. This can be effected because the ring 36 is fixed with respect to the lever handle 20.

Figure 4:
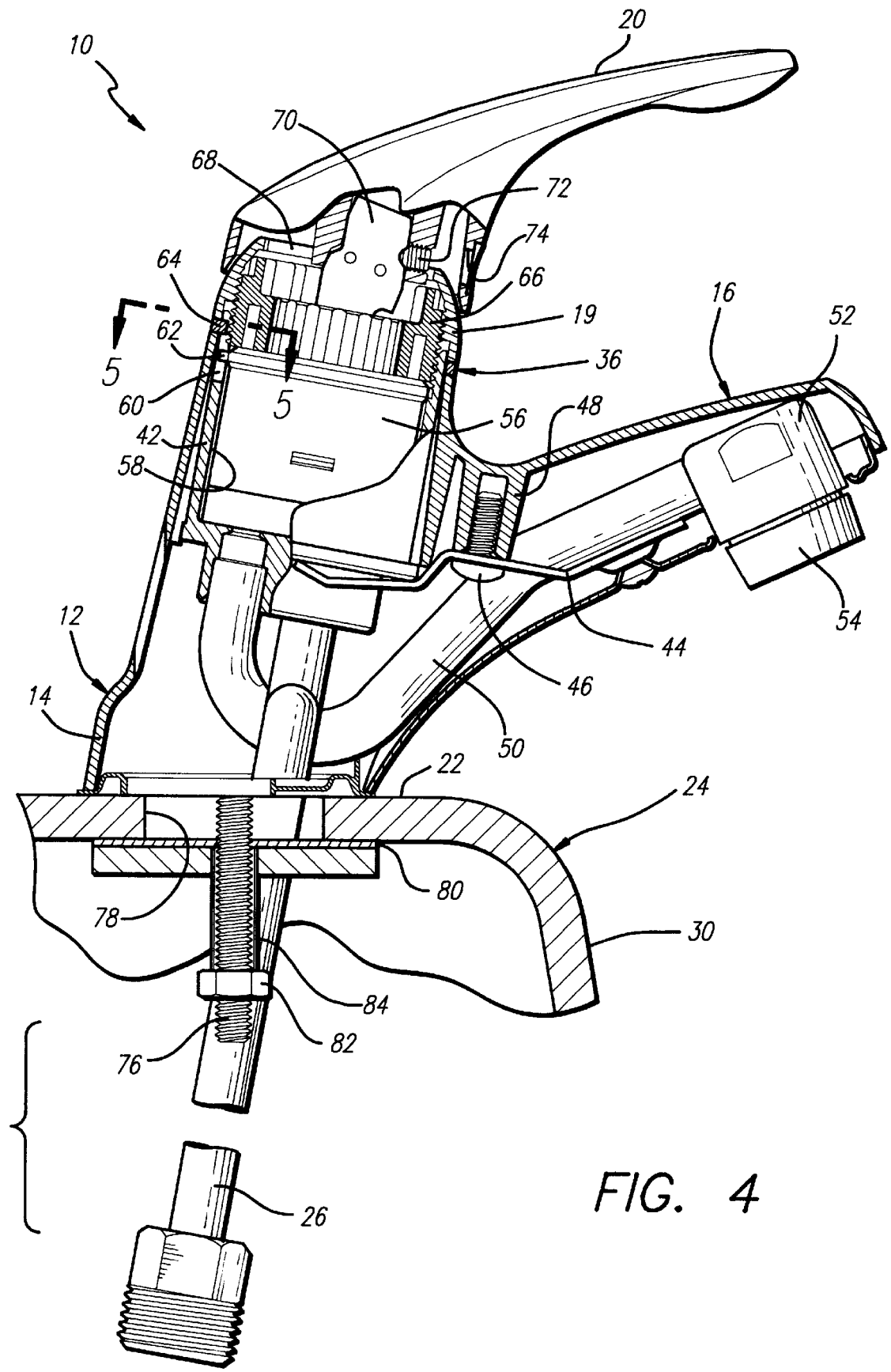
FIG. 4 is a partial sectional view showing various structural elements of the faucet in assembly with the color code element in accordance with certain principles of the invention.

Referring to FIG. 4, the faucet 10 further includes a brass body 42 which is secured with in the housing 12 by use of a bracket 44 and a screw 46 threaded into a boss 48 formed in the housing. The hot water conduit 26 and the cold water conduit 28 are secured to the underside of the brass body 42. An outlet conduit 50 is also secured to the underside of the brass support 42 and extends within the spout 16 to an outlet fitting 52 and an aerator 54.

The brass support 56, the conduits 26, 28 and 50, and the fitting 52 form a body subassembly which fit into the shell of the underside of the housing 12 in a prescribed manner due to the configuration of the structure of the body subassembly and the configuration of the inner portions of the shell of the housing. This arrangement insures that the brass support is mounted fixedly in a prescribed location and orientation within the housing when the bracket 44 and screw 46 are employed to secure the body subassembly with the housing.

A cartridge valve 56 of the type disclosed in U.S. Pat. No. 5,402,827, which is incorporated herein by reference thereto, is located within an upper opening 58 of the brass support 42 and is positioned to communicate with the inlet conduits 26 and 28 and the outlet conduit 50. The brass support 42 is formed with a slot 60 in an axial direction inward from an upper end of the support. Due to the prescribed location and orientation of the brass support 42 within the housing 12 as noted above, the slot 60 is located to receive a tab 62 of the valve 56 to properly orient the valve in the opening 58 of the brass support 42 and with respect to the conduits 26, 28 and 50 of the body subassembly.

The ring 36, which is formed with an inward directed tab 64 as shown in FIG. 5, is then placed on top of the tower 18 in the assembled position as shown in FIGS. 1 through 4. During assembly of the ring 36 with the tower 18, the tab 64 is located and positioned in the slot 60 of the brass support 42. The tab 64 extends radially inward from one of two junctures, on the periphery of the ring 36, where the "red" and "blue" colors meet. The location of the tab 64, in conjunction with the prescribed fixed location of the body subassembly within the housing 12 as noted above, insures that the ring 36 is assembled in the proper location with the "red" color on the left and the "blue" color being on the right as shown in FIG. 3.

While an assembler of the components of the faucet 10 can visually insure that the contrasting colors are in the proper location upon assembly, the tab 64 guides the assembler in precisely and properly locating the colored surfaces 38 and 40 equally on the respective sides of the faucet 10 from the front to the rear thereof. If desired, the opposite side walls of the slot 60 could be tapered inward from top to bottom and sides of the tab 64 could be tapered accordingly so that the ring 36 can be assembled in one orientation only thereby insuring the proper color location as described above.

Referring again to FIG. 4, a nut 66 having a threaded exterior is threadedly inserted into the opening 58 of the brass support 42 to secure the valve 56 within the opening 58 of the brass support 42. The threaded side wall of the nut 66 extend well above the top of the brass support 42 and provide for the threaded attachment of the shroud cover 19 to the nut and thereby secure the cover with the faucet 10. The shroud cover 19 is formed with a central opening 68 which provides a passage for a stem 70 of the valve 56. The lever handle 20 is mounted on the stem 70 and secured there by a screw 72 accessible through an opening 74 formed in the lever handle.

As the shroud cover 19 is threadedly secured to the nut 66, and thereby in the assembly of the faucet 10, the underside of the shroud cover engages and facilitates the captured securance of the ring 36 between the shroud cover and the top of the tower 18. The ring 36 can not move in any direction by virtue of the tab 64 within the slot 60 of the brass support 42 and by virtue of the captured securance between the shroud cover 19 and the top of the tower 18. Thus the ring 36 is fixedly secured in its highly visible, flush position.

Studs 76 (one shown) are secured to and extend from the underside of the faucet 10. When the faucet 10 is positioned on the shelf 22 of the sink 24, the studs 76 extend through openings 78 (one shown) formed in the shelf portion of the sink. A securing pad 80 is positioned over the studs 76 and is placed under the shelf 22 and secured in that position by a nut 82 and sleeve 84 to facilitate securance of the faucet 10 with the sink 24.

The ring 36 is preferably composed of aluminum and is formed by a conventional stamping operation. Other metals or non-metals could be used to make the ring 36 without departing from the spirit and scope of the invention. Also, the coloring of the peripheral surfaces 38 and 40 of the ring 36 can be accomplished preferably by a silk screening process whereby a colored liquid is wiped through a screen onto the peripheral surfaces and cured in the applied location. A process of this type is commercially available from Northern Engraving Corporation of Sparta, Wis. Other techniques, such as applying an adhesive-backed colored tape to the surfaces 38 and 40 or painting the surfaces, could be employed without departing from the spirit and scope of the invention. It is noted that the shading used in FIGS. 1, 2 and 3 to denote the "red" and "blue" colors for the ring surfaces 38 and 40, respectively, are the preferred colors. Other contrasting colors could be used on ring surfaces 38 and 40 without departing from the spirit and scope of the invention.

The ring 36 is placed in assembly in the faucet 10 in such manner that the peripheral colored surfaces 38 and 40 are flush with the adjacent portions of the tower 18 and shroud cover 19 and are thereby fully visible at all times. In addition, the ring 36 is fixedly mounted with the faucet 10 so that the ring never moves even though the lever handle 20 is moved. This allows the user to maintain a constant perspective of the relative direction that the lever handle 20 is being turned at all times during the water selection process. Further, since the ring 36 is fixedly mounted, the user can note the location of the lever handle 20 with respect to the fixed adjacent color location when having first selected a pleasant water temperature and thereafter, upon repeated use, move the lever handle to the same color location.

In general, the above-identified embodiments are not to be construed as limiting the breadth of the present invention. Modifications, and other alternative constructions, will be apparent which are within the spirit and scope of the invention as defined in the appended claims.

What is claimed is:

1. In a faucet, which comprises:
   a housing;
   a color code element mounted on the housing; and
   a cover located over at least a portion of the color code element and mounted on the housing so that the color code element is held fixedly between the housing and the cover.

2. In the faucet as set forth in claim 1, wherein the color code element is formed with at least two contrasting colors which are displayed on an exterior portion of the faucet.

3. In the faucet as set forth in claim 1, which further comprises:
   a mating structure formed on the color code element;
   a mating structure formed on the faucet which is complementary in configuration to the mating structure of the color code element to facilitate the precise locating of the color code element in its assembly with the housing.

4. In the faucet as set forth in claim 1, which further comprises:
   the housing formed with an exterior surface;
   the cover formed with an exterior surface; and
   the color code element formed with an exterior surface which is flush with adjacent portions of the exterior surfaces of the housing and the cover.

5. In the faucet as set forth in claim 1, which further comprises:
   the color code element having a first peripheral surface which forms a first portion of the exterior surface thereof and which is formed with a first color thereon;
   the color code element having a second peripheral surface which forms a second portion of the exterior surface thereof spaced from the first portion of the exterior surface thereof and which is formed with a second color thereon contrasting the first color.

6. In the faucet as set forth in claim 1, wherein the color code element is formed in the shape of a ring.

7. In the faucet as set forth in claim 1, which further comprises:
   structure fixedly secured to the housing and having a slot formed therein at a prescribed location of the faucet;
   a tab formed on the color code element and located in the slot of the structure to precisely locate the color code element relative to the housing.

8. In the faucet as set forth in claim 1, which further comprises:
   a handle mounted for movement relative to the color code element.

9. In the faucet as set forth in claim 1, wherein the two contrasting colors are red and blue.

10. A faucet, which comprises:
    a housing formed with a spout;
    the housing is formed with a front portion and a rear portion;
    a valve contained within the housing for selectively directing water to the spout;
    a handle mounted movably on the housing and attached to the valve for selecting hot water, cold water or a mixture thereof;
    an element having a first color on a first portion thereof and a second color contrasting the first color on a second portion thereof mounted on the housing in a position to continuously provide an indication to a user regarding the direction to turn the handle to select hot water or cold water;
    the first portion of the element extending between the front portion and the rear portion of the housing on a first side of the housing; and
    the second portion of the element extending between the front portion and the rear portion of the housing on a second side of the housing opposite the first portion of the housing.

11. A faucet, which comprises:
    a housing formed with a spout;
    a valve contained within the housing for selectively directing the water to the spout;
    a handle mounted movably on the housing and attached to the valve for selecting hot water, cold water or a mixture thereof;
    an element having a first color on a first portion thereof and a second color contrasting the first color on a second portion thereof mounted on the housing in a position to continuously provide an indication to a user regarding the direction to turn the handle to select hot water or cold water;
    a first structure for precluding rotational movement of the element in its mounting on the housing; and
    a second structure for precluding axial movement of the element in its mounting on the housing whereby the element is precluded from moving in any direction at any time relative to the housing.

12. A faucet, which comprises:
    a housing formed with a spout;
    a valve contained within the housing for selectively directing water to the spout;

a handle mounted movably on the housing and attached to the valve for selecting hot water, cold water or a mixture thereof;

an element having a first color on a first portion thereof and a second color contrasting the first color on a second portion thereof mounted on the housing in a position to continuously provide an indication to a user regarding the direction to turn the handle to select hot water or cold water;

a tower formed on the housing and having an outboard end;

a shroud cover assembled with the housing adjacent the outboard end of the tower; and the element being assembled with the housing between the outboard end of the tower and the shroud cover.

13. A faucet, which comprises:

a housing formed with a spout;

a valve contained within the housing for selectively directing water to the spout;

a handle mounted movably on the housing and attached to the valve for selecting hot water, cold water or a mixture thereof;

an element having a first color on a first portion thereof and a second color contrasting the first color on a second portion thereof mounted on the housing in a position to continuously provide an indication to a user regarding the direction to turn the handle to select hot water or cold water;

a support mounted fixedly in a prescribed location and orientation within the housing and having a slot formed therein;

a tab formed on the element; and the tab of the element being located in the slot of the support to insure the precise location and orientation of the element with respect to its mounting on the housing.

* * * * *